J. F. MASEK.
NET.
APPLICATION FILED APR. 8, 1909.
957,618.
Patented May 10, 1910.
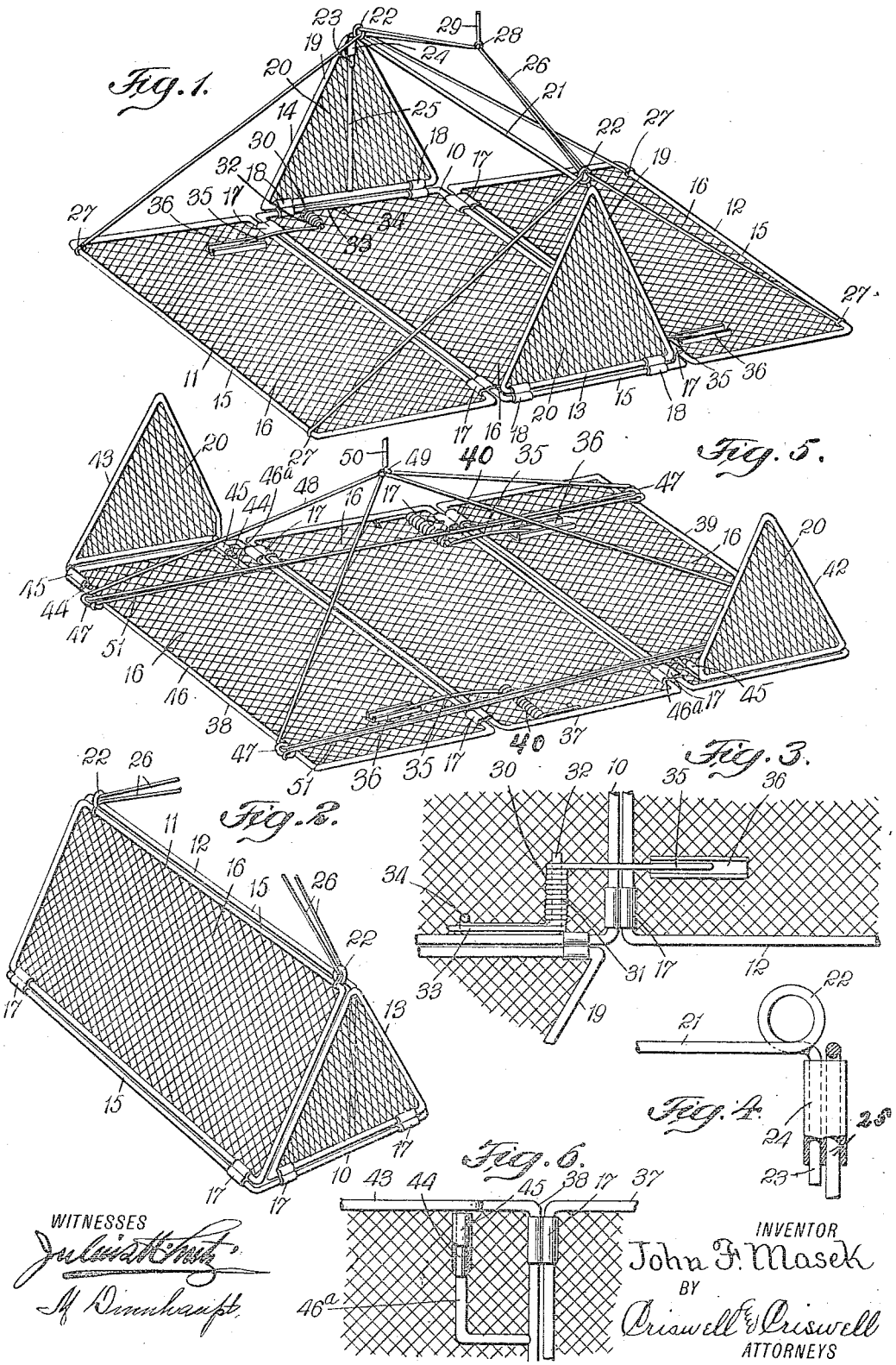
WITNESSES
INVENTOR
John F. Masek
BY
Criswell & Criswell
ATTORNEYS

UNITED STATES PATENT OFFICE.

JOHN F. MASEK, OF NEW YORK, N. Y.

NET.

957,618.　　　　　Specification of Letters Patent.　　Patented May 10, 1910.

Application filed April 8, 1909. Serial No. 488,643.

*To all whom it may concern:*

Be it known that I, JOHN F. MASEK, a citizen of the United States, and a resident of New York, county and State of New York, have invented certain new and useful Improvements in Nets, of which the following is a full, clear, and exact description.

This invention relates more particularly to a net adapted to catch crabs, lobsters, and other marine objects.

The primary object of the invention is to provide a simple and efficient net which will automatically open as the same is lowered into the water and strikes the bottom or bed, and which may be quickly folded so as to provide an inclosed receptacle to adapt the same to hold crabs or other objects when the same attempt to secure the bait usually placed in the receptacle on the bottom member when the device is lowered into the water.

Another object of the invention is to provide a simple and efficient device which may be readily made and assembled.

A further object of the invention is to provide a simple and efficient device which may be knocked-down for transportation or other purposes.

With these and other objects in view, the invention will be hereinafter more particularly described with reference to the accompanying drawings which form a part of this specification, and will then be pointed out in the claims at the end of the description.

In the drawings, Figure 1 is a detail perspective view of one form of device embodying my invention, showing the same in an open position. Fig. 2 is a perspective view showing the device in a closed position. Fig. 3 is a fragmentary detail plan view, showing how the members are held together, and how the same may be automatically opened when the device is lowered into the water. Fig. 4 is a fragmentary elevation, partly in section, showing the means for holding the longitudinally-extending rod to the device. Fig. 5 is a detail perspective view of a somewhat different construction; and Fig. 6 is a fragmentary plan view, partly broken away, showing how the end members of Fig. 5 may be detachably held to the side members.

The device may be variously constructed and may be of various forms. As shown, it has a base member 10 and two side members 11 and 12, all of which are substantially rectangular in form, and to the bottom member and at the ends thereof are the substantially triangular end pieces or members 13 and 14. The members 10, 11 and 12 each comprise a frame 15, which is covered by wire mesh 16 or other open work, and said frames are hinged together at their side edges, as at 17. Each hinge 17 may be formed by bending a strip of metal in the form of a loop to engage the frame, and on the ends of the bottom member 10 are similar hinges 18 for the end members 13 and 14. These members 13 and 14 each have a substantially triangular frame 19 which is inclosed by open wire mesh or work 20 to prevent a crab or other object from escaping from the device when in a closed position, and connecting the two members 13 and 14 at the upper edge or apex thereof is a rod 21. This rod 21 is bent to form loops or eyes 22 adjacent to the end members 13 and 14 and have downwardly-extending parts 23 which are removably held in the sleeve or device 24 secured to an upright bar or rod 25 forming a part of the frame of the members 13 and 14. By this means the end members are held in a normally upright position, and the side members are permitted to be raised or lowered as desired.

To raise the side members, I provide a cord or other flexible connection 26, which is fastened, as at 27, to the outer side edges of the members 11 and 12, and said flexible connection extends from the opposite member through the eyes 22 and are joined together, as at 28, from which projects a line 29, so that by pulling on the line 29 the members 11 and 12 will be swung inward on their hinges 17 against the side edges of the end pieces 13 and 14, as shown in Fig. 2, these making a receptacle or device which is substantially triangular in form.

A spring 30 is located at the opposite ends of the bottom member 10, and this spring has a coil portion 31, Fig. 3, which fits about a rod 32 and has one end, as 33, held to the projecting part 34 which may be formed as a part of the rod 32 when the device of which 32 and 34 form a part is annular as shown, and the opposite end of said spring, as 35, has its end extended upward and is held to slide in a substantially U-shaped guide 36 formed by a plate having side walls so that the end of said part 35 of the spring may move along the guide 36 when the side members 11 and 12 are raised and lowered, the said guides 36 being held to the members 11 and 12, one for each spring in any desired way.

When the device is intended to be used, a bait such as meat, fish or other material is placed upon the bottom member 10, and the device is lowered into the water. As soon as the device reaches the bottom, the line 29 and connection 26 will become slack and this will permit the springs 30 to force the members 11 and 12 outward, as shown in Fig. 1, and when the line 29 is hauled or forced upward, the springs 30 will yield to permit the sides to be moved to the position shown in Fig. 2, thus holding the crabs or other objects that may be within the device and preventing the same from escaping.

It will be seen that by removing the rod 21, the sides 11 and 12 may be folded over, as the springs 30 may be readily detached, and the end members may then be folded over so that the entire device may be knocked-down and placed in a compact position for transportation or for other purposes.

In Figs. 5 and 6, the bottom 37 has side members 38 and 39 of substantially the same form and construction, and hinged at the edges thereof in substantially the same manner as already described, and these members may have spring devices, as 40, to normally force the side members into an open position in the same manner as shown in Figs. 1 and 3. In the construction shown in Figs. 5 and 6, the end members 42 and 43 are detachably held to the ends of the side members 38 and 39 so as to be disposed diametrically opposite to each other. Each end member is provided with inwardly-projecting rods or parts 44 at the ends thereof, each of which are adapted to be detachably held in a sleeve or eye 45. One sleeve 45 is held to the outer end rod 46 of each of the frame members 38 and 39, and the other eye or sleeve is held to the angular rod 46ᵃ which is held to the end and side rods of the frame of each of the members 38 and 39. This permits the end members 42 and 43 to be detachably held to the side members 38 and 39 and normally holds the same when in use in an upright position and permits the end members to be removed to transport the device or knock-down the same when it is desired to do so for any purpose whatever. Each of the edge rods 46 have eyes 47 secured thereto, and passing through these eyes is a flexible connection 48. The flexible connection 48 is made by passing the connection through the eyes so as to slip through the same readily, and to join the same substantially centrally of the device, as at 49, and leading from the connection 49 is a line or other connection 50 for raising or lowering the device in the water.

A second flexible connection 51 is connected to the eyes 47 between the opposite members and on opposite sides of the device, so as to limit the opening movement of the side members 46 and 47, and in this construction as well as in Figs. 1 to 4, the frame of each or any of the members may be provided with a marginal wall to extend a short distance above the open work or wire mesh. The device, when the side members 38 and 39 are forced over, will carry the end pieces or members 42 and 43 over upon the bottom member 37 and the device will then have the appearance of that shown in Fig. 2.

From the foregoing it will be seen that a simple and efficient device is provided in which crabs or other marine objects may be caught; that said device may be readily assembled or dis-connected to adapt the same for transportation or other purposes; that said device, by having the members made in the manner shown, is not likely to become dis-arranged and will serve as an effective means for providing a closed receptacle; and that simple means is provided for causing the side members to move to either a closed or an open position.

Having thus described my invention, I claim as new and desire to secure by Letters Patent:—

1. A device of the character described, comprising a plurality of rectangular members hinged together, a plurality of triangular members rigidly connected to one of said rectangular members, a rod having loops thereon connecting the free ends of said triangular members and flexible means adapted to pass through said loops for bringing the edge portions of the other two rectangular members in contact with the edge portion of the triangular members.

2. A device of the character described, comprising substantially rectangular bottom and side members each having a frame, and an open work covering the frame, hinges pivotally holding the side members to the bottom member at the side edges thereof, two substantially triangular end members hinged to the ends of the bottom member, a rod having loops thereon and provided with downwardly projecting portions, sleeves carried by the upper portion of the end members, and engaged by the downwardly projecting portions of the rods, a flexible connection held at its ends to the outer edge of the side members on opposite sides thereof and passing through the loops of the rod, and means connected to the flexible connection whereby the device may be raised or lowered in the water.

3. A device of the character described, comprising a bottom and side members each having a frame, and an open work covering the frame, two substantially triangular end members, a rod having loops thereon and provided with downwardly projecting portions, sleeves carried by the upper portion of the end members and engaged by the downwardly projecting portion of the rods, and a flexible connection held at its ends to the outer edge of its side members on opposite sides thereof and passing through the loops of the rod.

4. A device of the character described, comprising a plurality of side, bottom and end members, a rod having loops thereon and provided with projecting portions, sleeves carried by the upper portion of the end members and engaged by the projecting portion of the rod, and means for moving certain of the members.

5. A device of the character described, comprising end members, a bottom member, and two side members, means for raising and lowering the side members, a guide held to each of the side members, and springs held to the bottom member and having one end thereof engaging the guides to form a sliding connection therewith.

This specification signed and witnessed this 6th day of April A. D. 1909.

JOHN F. MASEK.

Witnesses:
W. A. TOWNER, Jr.,
M. DINNHAUPT.